United States Patent
Feldman

(10) Patent No.: US 9,460,751 B2
(45) Date of Patent: Oct. 4, 2016

(54) BINDING SHINGLED RECORDING BANDS

(71) Applicant: Seagate Technology LLC, Cupertino, CA (US)

(72) Inventor: Timothy R Feldman, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/028,399

(22) Filed: Sep. 16, 2013

(65) Prior Publication Data

US 2016/0012850 A1    Jan. 14, 2016

(51) Int. Cl.
  *G11B 5/09*  (2006.01)
  *G11B 20/18* (2006.01)
  *G11B 20/12* (2006.01)
  *G11B 27/32* (2006.01)

(52) U.S. Cl.
  CPC ....... *G11B 20/1889* (2013.01); *G11B 20/1217* (2013.01); *G11B 20/1258* (2013.01); *G11B 27/322* (2013.01); *G11B 2020/1278* (2013.01); *G11B 2020/1292* (2013.01)

(58) Field of Classification Search
  None
  See application file for complete search history.

(56) References Cited

U.S. PATENT DOCUMENTS

| | | | |
|---|---|---|---|
| 5,596,458 A * | 1/1997 | Emo | G11B 5/00 360/46 |
| 6,556,522 B1 | 4/2003 | Ko | |
| 6,728,899 B1 | 4/2004 | Ng | |
| 7,245,445 B2 * | 7/2007 | Lee | 360/48 |
| 7,486,460 B2 * | 2/2009 | Tsuchinaga | G11B 5/012 360/48 |
| 7,679,851 B1 * | 3/2010 | Sun et al. | 360/48 |
| 7,738,205 B2 * | 6/2010 | Maeno et al. | 360/53 |
| 7,752,509 B2 * | 7/2010 | Ko | 714/710 |
| 7,813,236 B2 | 10/2010 | Gotoh | |
| 8,120,868 B2 * | 2/2012 | Bi | G11B 5/59655 360/48 |
| 8,179,627 B2 * | 5/2012 | Chang | G11B 5/012 360/31 |
| 8,270,256 B1 | 9/2012 | Juang | |
| 8,385,162 B2 | 2/2013 | Rosen | |
| 8,416,646 B2 | 4/2013 | Huang | |
| 8,432,633 B2 | 4/2013 | Grobis | |
| 8,593,748 B1 * | 11/2013 | Bandic | G11B 5/09 360/31 |
| 8,699,185 B1 * | 4/2014 | Teh | G11B 5/012 360/135 |
| 8,711,500 B1 * | 4/2014 | Fong | G11B 27/36 360/31 |
| 8,711,665 B1 * | 4/2014 | Abdul Hamid | 369/44.32 |
| 8,724,245 B1 * | 5/2014 | Smith | G11B 5/5526 360/49 |

(Continued)

OTHER PUBLICATIONS

Written Opinion, PCT/US2014/055955, 6 pages.

(Continued)

*Primary Examiner* — Dismery Mercedes
(74) *Attorney, Agent, or Firm* — Cesari & Reed, LLP; Kirk A. Cesari; Christian W. Best

(57) ABSTRACT

Systems and methods are disclosed for binding shingled recording bands in data storage devices, particularly devices employing shingled magnetic recording. In one embodiment, an apparatus may comprise a controller configured to define boundaries of an area of a data storage medium based on a constraint and a list of defective sectors. In another embodiment, an apparatus may comprise a data storage device including a memory configured to store data in a shingled manner where one track partially overlaps an adjacent track, and a controller configured to define boundaries of a plurality of bands, each band including a plurality of tracks of the memory, based on the results of an error discovery scan for defective sectors of the memory.

20 Claims, 14 Drawing Sheets

(56) References Cited

U.S. PATENT DOCUMENTS

| | | | |
|---|---|---|---|
| 8,832,409 B2* | 9/2014 | Feldman | G11B 5/012 |
| | | | 711/173 |
| 8,908,310 B1 | 12/2014 | Bai et al. | |
| 8,988,800 B1 | 3/2015 | Varnica et al. | |
| 9,036,284 B1* | 5/2015 | Feldman | G11B 20/1217 |
| | | | 360/31 |
| 9,286,150 B2* | 3/2016 | Feldman | G06F 3/0608 |
| 2007/0183071 A1* | 8/2007 | Uemura | G11B 5/09 |
| | | | 360/48 |
| 2008/0304172 A1* | 12/2008 | Bi | G11B 5/59655 |
| | | | 360/48 |
| 2009/0055620 A1* | 2/2009 | Feldman | B82Y 25/00 |
| | | | 711/202 |
| 2011/0304935 A1* | 12/2011 | Chang et al. | 360/48 |
| 2012/0212847 A1* | 8/2012 | Sato | G11B 5/012 |
| | | | 360/31 |
| 2012/0233432 A1* | 9/2012 | Feldman | G11B 5/012 |
| | | | 711/170 |
| 2012/0300325 A1 | 11/2012 | Hall | |
| 2012/0300341 A1 | 11/2012 | Matsuo | |
| 2013/0057981 A1 | 3/2013 | Urakami | |

OTHER PUBLICATIONS

International Search Report, PCT/US2014/055955, 4 pages.
International Search Report and Written Opinion, PCT/US2014/055957, 12 pages.
Ahmed Amer, et al.;Design Issues for a Shingled Write Disk System, © 2010 IEEE.
International Search Report and Written Opinion, PCT/US2014/055953, 9 pages.

* cited by examiner

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| Isolation | Isolation | Isolation | Isolation | Isolation | Isolation | Isolation | Isolation | Isolation | Isolation |
| 1 | 2 | 3 | 4 | 5 | 6 | 7 | 8 | 9 | 10 |
| 11 | 12 | 13 | 14 | Defect | 15 | 16 | 17 | 18 | 19 |
| 20 | 21 | 22 | Defect | 23 | 24 | 25 | 26 | 27 | 28 |
| 29 | 30 | Defect | 31 | 32 | 33 | 34 | 35 | 36 | 37 |
| Isolation | Isolation | Isolation | Isolation | Isolation | Isolation | Isolation | Isolation | Isolation | Isolation |

Band A: rows 1–5; Band B: rows 6–10

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| Spare | Spare | Spare | Spare | Spare | Spare | Spare | Spare | Spare | Spare |
| Isolation | Isolation | Isolation | Isolation | Isolation | Isolation | Isolation | Isolation | Isolation | Isolation |
| 1 | 2 | 3 | 4 | 5 | 6 | 7 | 8 | 9 | 10 |
| 11 | 12 | 13 | 14 | 15 | 16 | 17 | 18 | 19 | 20 |
| Not used | Not used | Defect | Defect | Defect | Not used | Not used | Not used | Not used | Not used |
| 21 | 22 | 23 | 24 | 25 | 26 | 27 | 28 | 29 | 30 |
| 31 | 32 | 33 | 34 | 35 | 36 | 37 | 38 | 39 | 40 |
| Isolation | Isolation | Isolation | Isolation | Isolation | Isolation | Isolation | Isolation | Isolation | Isolation |

Band A (rows 1–6), Band B (rows 7–12)

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| Isolation | Isolation | Isolation | Isolation | Isolation | Isolation | Isolation | Isolation | Isolation | Isolation |
| 1 | 2 | 3 | 4 | 5 | 6 | 7 | 8 | 9 | 10 |
| 11 | 12 | 13 | 14 | 15 | 16 | 17 | 18 | 19 | 20 |
| Not used | Not used | Defect | Defect | Defect | Not used | Not used | Not used | Not used | Not used |
| 21 | 22 | 23 | 24 | 25 | 26 | 27 | 28 | 29 | 30 |
| 31 | 32 | 33 | 34 | 35 | 36 | 37 | 38 | 39 | 40 |
| Isolation | Isolation | Isolation | Isolation | Isolation | Isolation | Isolation | Isolation | Isolation | Isolation |

Band A: first five rows. Band B: last five rows.

FIG. 7

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | Isolation | Isolation | Isolation | Isolation | Isolation | Isolation |
| Isolation | Isolation | Isolation | Isolation | 1 | 2 | Defect | 3 | 4 | 5 |
| 6 | 7 | 8 | 9 | 10 | Defect | 11 | 12 | 13 | 14 |
| 15 | 16 | 17 | 18 | Defect | 19 | 20 | 21 | 22 | 23 |
| 24 | Isolation | Isolation | Isolation | Isolation | Isolation | Isolation | Isolation | Isolation | Isolation |

Band A: rows 1–3
Band B: rows 4–7

FIG. 8

BINDING SHINGLED RECORDING BANDS

BACKGROUND

The present disclosure relates to data storage mediums, and provides systems and method for improving data storage device performance, especially when using shingled magnetic recording.

SUMMARY

In one embodiment, an apparatus may comprise a controller configured to define boundaries of an area of a data storage medium based on a constraint and a list of defective sectors.

In another embodiment, a method may comprise defining boundaries of an area of a data storage medium based on a constraint and a list of defective sectors.

In another embodiment, an apparatus may comprise a data storage device including a memory configured to store data in a shingled manner where one track partially overlaps an adjacent track, and a controller configured to define boundaries of a plurality of bands, each band including a plurality of tracks of the memory, based on the results of an error discovery scan for defective sectors of the memory.

BRIEF DESCRIPTION OF THE DRAWINGS

FIG. 5 is a diagram of another illustrative embodiment of a system for binding shingled recording bands;

FIG. 6 is a diagram of another illustrative embodiment of a system for binding shingled recording bands;

FIG. 7 is a diagram of another illustrative embodiment of a system for binding shingled recording bands;

FIG. 8 is a diagram of another illustrative embodiment of a system for binding shingled recording bands;

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, exchanged, or removed without departing from the scope of the present disclosure.

Figure 1:
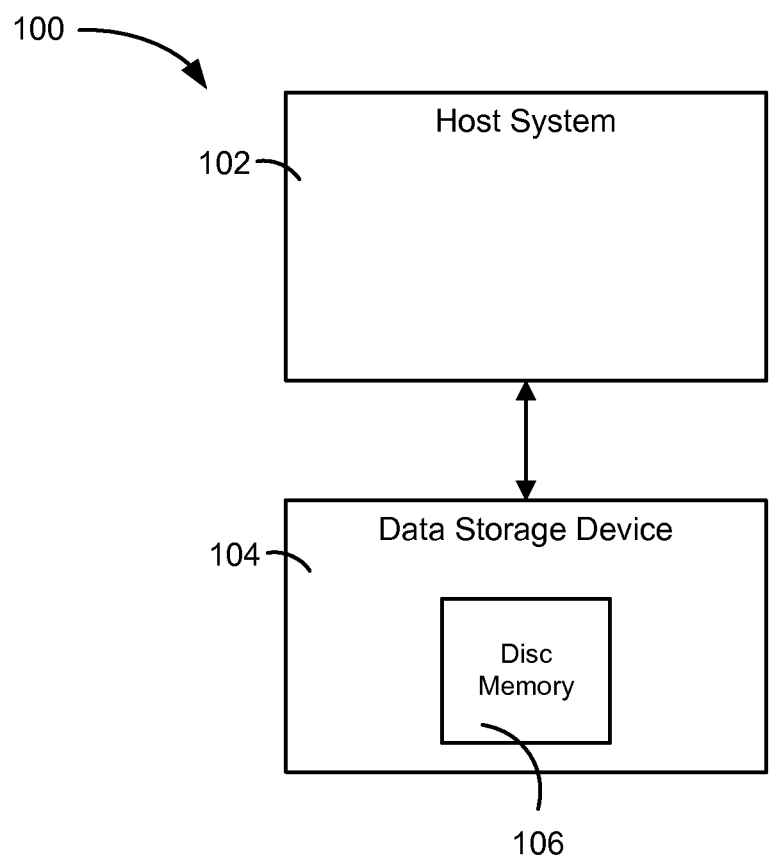
FIG. 1 is a diagram of an illustrative embodiment of a system for binding shingled recording bands.

FIG. 1 depicts an embodiment of a system for binding shingled recording bands, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories 106. In the depicted embodiment, the DSD 104 is a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

On some embodiments, DSD 104 may have one or more discs 106 having tracks for storing data. A disc 106 may be divided into multiple zones, each with a plurality of tracks. Each track can be further divided into a plurality of physical sectors for storing data. Chunks of data with accompanying logical block addresses (LBAs) can be stored to the sectors, with the LBAs being mapped to the sector holding the respective chunk of data. Each zone may have different configurations of various options, such as data track format, direction of writing from a transducer, data density, or intended uses. For example, the disc may have one or more zones designated for data storage in a shingled track manner using shingled magnetic recording (SMR), and one or more zones for storing data in a non-shingled manner. SMR is a recording method used to increase data recording density on a disc, for example by writing a track of data to partially overlap an adjacent data track. SMR will be discussed in more detail with regard to FIGS. 3-4. The disc may also have a zone designated as a 2nd level cache using disk storage intended for non-volatile caching of data. The disc may further have at least one zone designated for spare sectors.

Figure 2:
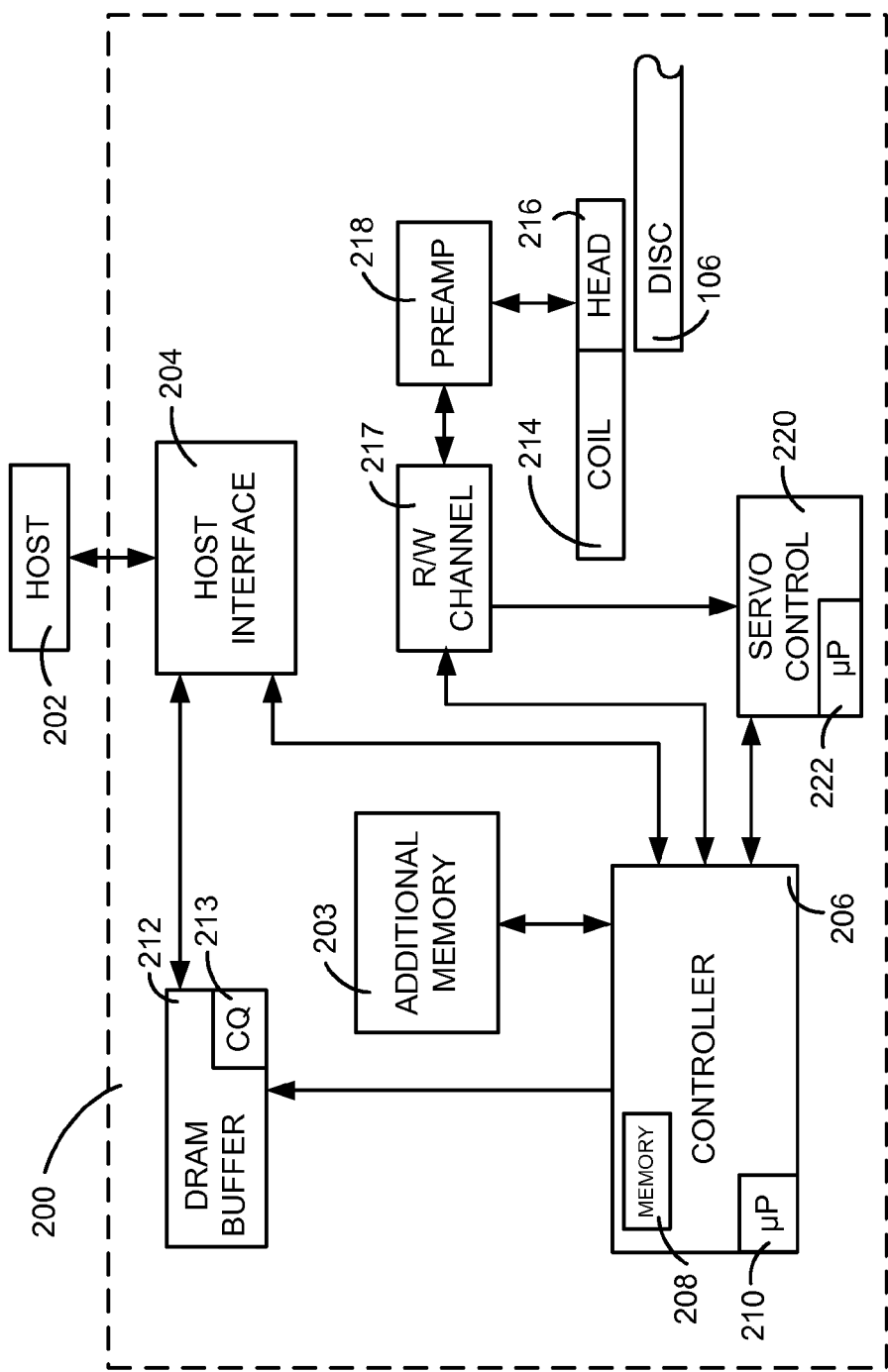
FIG. 2 is a diagram of another illustrative embodiment of a system for binding shingled recording bands.

FIG. 2 depicts a diagram of an embodiment of a system for binding shingled recording bands, generally designated 200. Specifically, FIG. 2 provides a functional block diagram of an example disc drive data storage device (DSD) 200. The DSD 200 may be a data storage device such as the disc drive 100 shown in FIG. 1. More generally, the DSD 200 can be a removable storage device, a desktop computer, a laptop computer, a server, a tablet computer, a telephone, a music player, another electronic device, any other device which may be used to store or retrieve data, or any combination thereof.

The data storage device 200 can communicate with a host device 202 via a hardware or firmware-based interface circuit 204 that may include a connector (not shown) that allows the DSD 200 to be physically removed from the host 202. The host 202 may also be referred to as the host system or host computer. The host 202 can be a desktop computer, a laptop computer, a server, a tablet computer, a telephone, a music player, another electronic device, or any combination thereof. In some embodiments, the DSD 200 may communicate with the host 202 through the interface 204 over wired or wireless communication, or by a local area network (LAN) or wide area network (WAN). In some embodiments, the DSD 200 can be a stand-alone device not connected to a host 202, or the host 202 and DSD 200 may both be part of a single unit.

The buffer 212 can temporarily store data during read and write operations, and can include a command queue (CQ) 213 where multiple pending operations can be temporarily stored pending execution. In some examples, the buffer 212 can be used to cache data. The DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. A DSD 200 containing multiple types of nonvolatile storage mediums, such as a disc 106 and Flash 203, may be referred to as a hybrid storage device. The disc 106 may be configured to store data in a shingled manner.

The DSD 200 can include a programmable controller 206 with associated memory 208 and processor 210. Further, FIG. 2 shows the DSD 200 can include a read-write (R/W) channel 217, which can encode data during write operations and reconstruct user data retrieved from disc(s) 106 during read operations. A preamplifier circuit (preamp) 218 can apply write currents to the head(s) 216 and provides pre-amplification of read-back signals. A servo control circuit 220, which can include a processor 222, may use servo data to provide the appropriate current to the coil 214 to position the head(s) 216. The controller 206 can communicate with the servo control circuit 220 to move the head(s) 216 to the desired locations on the disc(s) 106 during execution of various pending commands in the command queue 213.

As discussed above, SMR is a recording method used to increase data recording density on a disc, which can be accomplished by decreasing track width below a width written by a writer element of a transducer head. In other words, a disc may be formatted with tracks that have a narrower pitch than is written by a write head. This can be accomplished by partially overwriting a data track with an adjacent data track, resulting in a "shingled" track structure. For example, SMR write operations can be performed by sequencing writes so that they progress in one radial direction (i.e. tracks may be written one at a time moving from the inner diameter towards the outer diameter, or vice-versa), where tracks partially overlap each other similar to roofing shingles. Partially overwriting a track with another track may also be referred to as "trimming." A single write direction may be used across an entire disc, but can also be selected based on zones or sets of tracks, with a direction set for each zone or set of tracks.

Figure 3A:
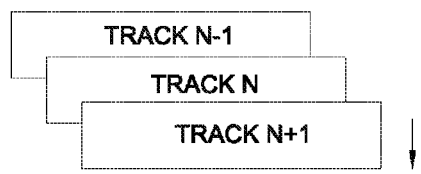
FIGS. 3a-3b are diagrams of another illustrative embodiment of a system for binding shingled recording bands.

Referring to FIG. 3a, if it is assumed that writing is performed in the arrow-indicated direction in the single-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher tracks per inch (TPI) characteristic in a radial direction of a storage medium.

Figure 3B:
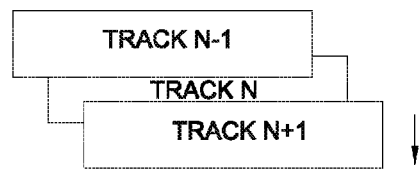

As illustrated in FIG. 3b, after writing on track N, if track N−1 is written in a reverse direction of the shingled recording direction, track N may become unreadable due to Adjacent Track Interference (ATI). Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time.

Figure 4A:
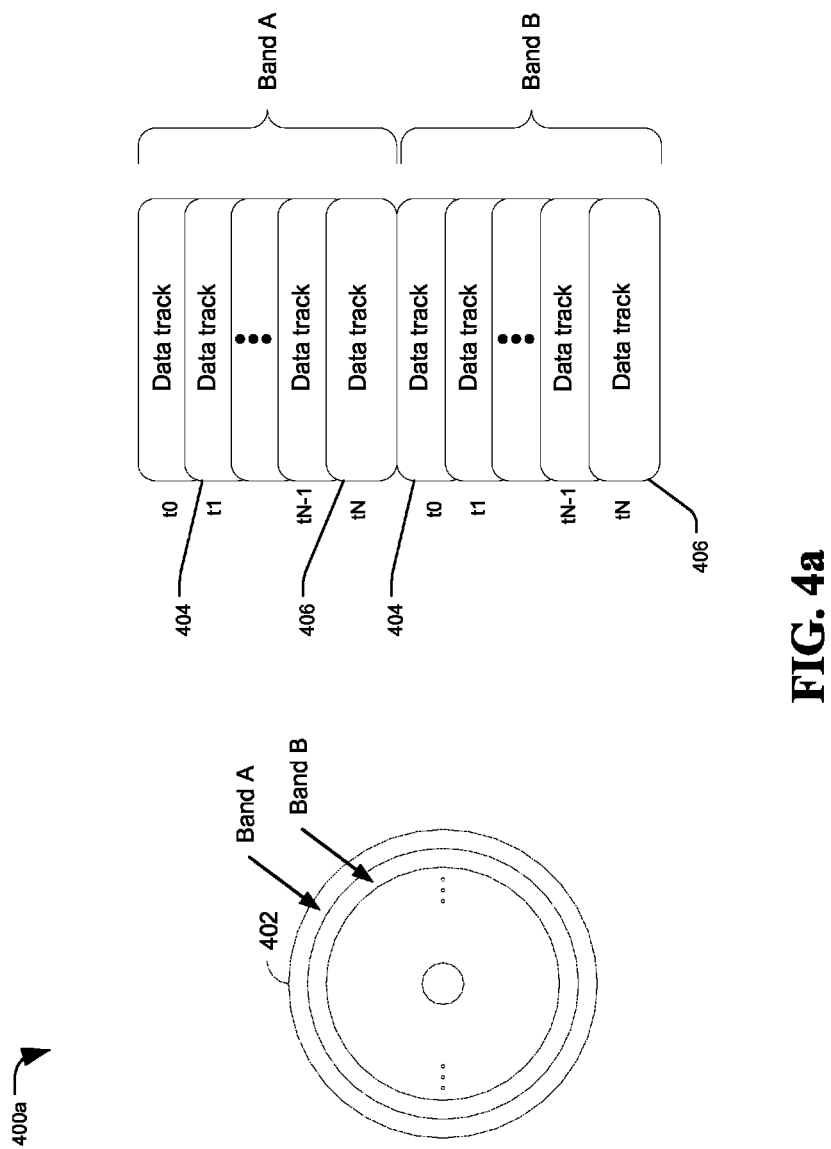
FIGS. 4a-4c are diagrams of other illustrative embodiments of a system for binding shingled recording bands.

Turning now to FIG. 4a, a diagram of another illustrative embodiment of a system 400a for binding shingled recording bands is depicted. Due to the track write overlap of SMR, writing a given track N−1 after track N has been written may require rewriting all shingled tracks that following track N−1 (i.e. track N, track N+1, track N+2, etc.). In order to accomplish this realistically, a set of tracks may be grouped into a "band," such that writing the last track of the band X does not require rewriting any of the following tracks X+1, X+2, X+3 and so on. Rotating disc media 402 may be divided into a plurality of bands (e.g. Band A, Band B, etc.), and each band may contain a plurality of shingled data tracks. In an example embodiment, disc 402 may be divided into a plurality of zones, with some zones including one or more shingled recording bands, while other zones may include non-shingled tracks. Different bands or all bands within different zones may be written in different radial directions (i.e. ID to OD, or vice versa).

Separating bands so that rewriting one does not require rewriting tracks outside the band can be accomplished by locating the tracks such that the last track of a band is not trimmed or overlapped by a track that can be written. This in turn can be accomplished in a number of ways. One approach is to select tracks to be at the end of bands and make the radial pitch allocated to these tracks the full, unshingled track width. For example, a band may include tracks having two or more track widths. Bands may have a number of shingled tracks 404, such as tracks t0 through tN−1 of FIG. 4a, which are partially overlapped by adjacent tracks and have a reduced read track pitch relative to the write track pitch. Bands may also end with an unshingled track 406, such as track tN of FIG. 4a, which does not have a reduced read track pitch relative to its write track pitch. Because the last track 406 is not overlapped by a writable track, the band can be rewritten without affecting tracks outside the band. This approach may require determining track and band layouts early in the disc fabrication process, as the final track in a band may require a different track pitch than the other tracks in the band. In other words, it may be necessary to determine where bands will begin and end prior to defining the tracks on the disc.

Figure 4B:
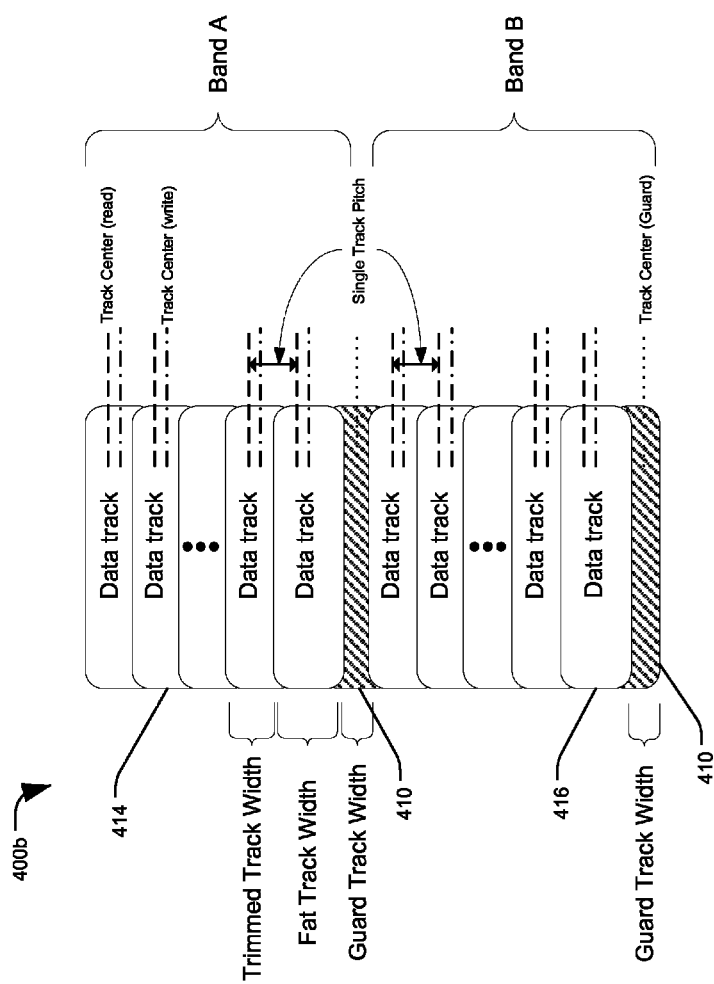

Alternatively, one or more tracks following each end-of-band track can be designated as not to be written. Turning now to FIG. 4b, a diagram of another illustrative embodiment of a system 400b for binding shingled recording bands is depicted. Not-to-be-written tracks may be referred to as "guard tracks" 410, as they provide band boundaries (e.g. physical boundaries that are not written) to separate writable tracks of different bands and guard the last track 416 of a band from being trimmed by or trimming tracks outside the band. When track N−1 needs to be re-written, tracks N−1 to the Guard Track can be rewritten, while tracks in other bands are not affected. In some embodiments, a single guard track may be used, while in some embodiments multiple tracks may be designated as "not to be written" between bands to provide a larger buffer against ATI. A guard track may also be referred to as a guard band or isolation track. In some embodiments, an isolation track may comprise rotational fractions of one or more tracks instead of one or more complete tracks. For example, if each track has 100 sectors, an isolation track may include sectors 1-50 of Track A and sectors 51-100 of Track B, instead of being limited to using sectors 1-100 of Track B. For the sake of clarity, it will be assumed for the present examples that the tracks of the band and the isolation track are whole tracks.

In some embodiments, the guard track between bands can be a full non-shingled track (i.e. a track not trimmed by either adjacent track), but this may again require different track pitches and consequently require determining band boundaries prior to defining the tracks on the disc. In other embodiments, a guard track may be a shingled track which is not used to store data. In other words, all writable tracks and guard tracks may have the same width. Using this approach, band layouts may not need to be determined early, as the guard tracks and shingled tracks may have the same track pitch and write centers, allowing any track to be used as a guard track. In an example embodiment of a disc with multiple bands per zone, each zone may contain 110 tracks, and the 110 tracks may be divided into 10 bands containing 10 data tracks and 1 guard track each.

Guard tracks may be overlapped by both adjacent tracks without loss of data, as data may not be recorded to guard tracks. Accordingly, while all tracks may share the same width or write track center when defined on the disc, a band may include multiple track widths or read track centers in practice. As shown in FIG. 4b, trimmed tracks 414 may have one width due to being partially overlapped in one direction; the last data tracks in each band 416, or "fat tracks," may have a second track width due to not being overlapped in either direction; and the guard tracks 410 may have a third track width due to being overlapped in both directions. The read center may be designated as the same for both shingled tracks 414 and "fat tracks" 416 for simplicity, or in some embodiments the read center for fat tracks 416 can be designated as the same as the write center.

Figure 4C:
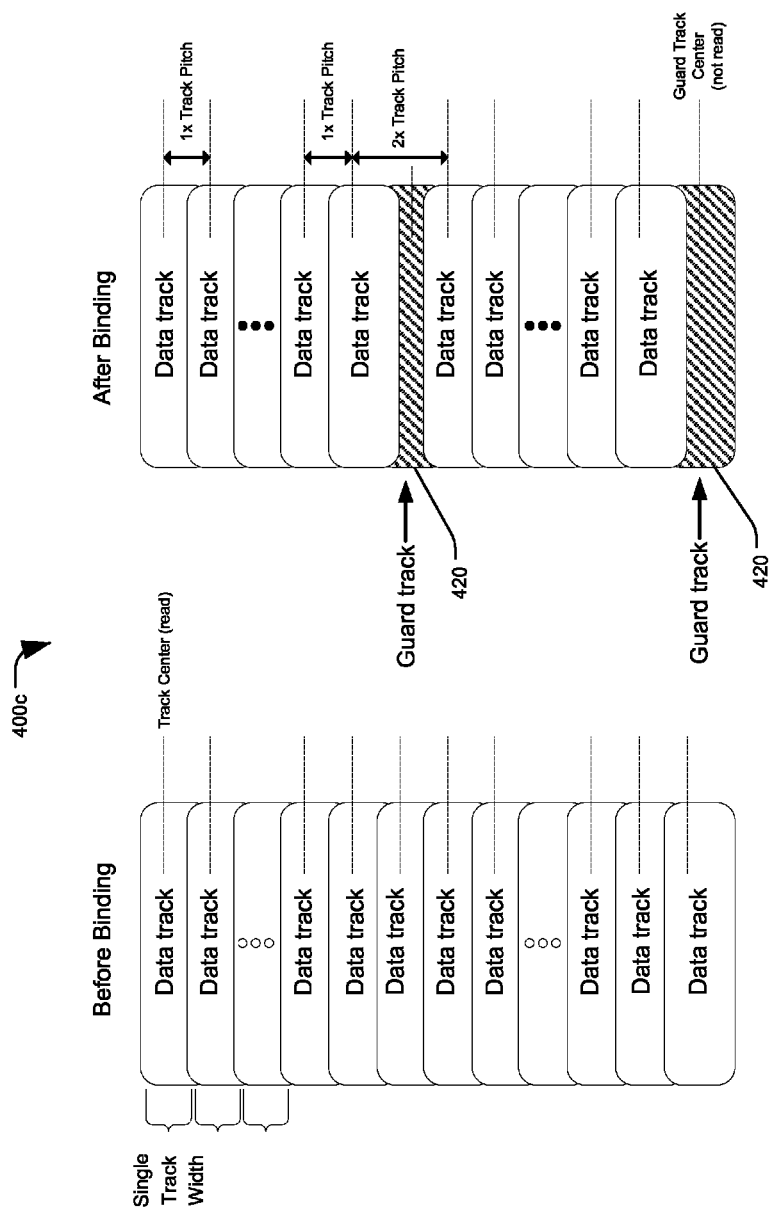

Turning now to FIG. 4c, a diagram of another illustrative embodiment of a system 400c for binding shingled recording bands is depicted. FIG. 4c provides more detail on designating guard tracks or band boundaries. Band boundaries may be set by a process called "binding," as discussed below. A disc may be formatted with a number of tracks. In an example disc configured for SMR, each track may be defined with the same width, as shown in the "before binding" diagram. After formatting the tracks on the disc, band boundaries can be selected, and appropriate tracks can be designated as guard tracks 420. As each track formatted on the disc may have the same width, any given track may be selected to be a guard track 420. This may result in a single track pitch between adjacent data tracks within a given band, and a 2x track pitch between the last data track in a band and the first data track in the next adjacent band. Accordingly, track and band boundaries may not need to be determined before defining the tracks on the disc, and can be performed after binding.

In some embodiments it may be desirable to have bands of a varying number of tracks on the disc. For example, it may be desirable to be able to remap data from one band to another, such as by moving data from a first physical band to a second physical band, and changing the logical band identifiers for those bands (e.g. a set of data may be stored to "logical band 1," currently mapped to the first physical band, and then moved to the second physical band which then becomes logical band 1). Moving data in such a manner may require that each band have the same minimum usable data storage capacity. Tracks at the outer diameter (OD) of a disc may have a different number of usable data sectors for storing data than tracks at the inner diameter (ID). So if bands are intended to have approximately the same storage capacity, bands near the OD may desirably include a different amount of tracks than bands near the ID. While bands can be set to have the same number of tracks, this may result in inefficiency and unused sectors in some bands.

The size or boundaries of bands may be set by "binding." "Binding" may refer to the decision of where the band boundaries are, including defining the writable tracks of bands and guard tracks. For example, one or more fractional nominal-pitch or width tracks may be assigned as guard tracks. Binding can be used to identify for a drive which tracks can be written, a write direction for a band, and which tracks must be rewritten when updating a band. Binding may be done during processing of the whole drive; that is, it may be a set of decisions made based on the combination of the components in the hard disc assembly (HDA) and the board. Binding in the field or field configuration of band boundaries can be problematic.

Early binding may entail defining band boundaries early on in processing, prior to performing defect discovery on a disc. Defect discovery may be performed by a drive during formatting. Defect discovery could be performed in a factory prior to shipping units, or it could occur as part of a "finish in field" capability, where a drive finalizes disc formatting after delivery.

The early binding process may be simple and involve setting each band to a set number of data tracks and radial space on a disc surface. However, early binding may be sub-optimal for various constraints. For example, early binding may be sub-optimal when a minimum user capacity is required for each band so that any of a set of approximately same-sized logical bands can be mapped to any physical band. This may be due to potential defects causing bands to have less than the required capacity. Other such constraints may include over provisioning, such as for band isolation, and maximum allowable band read-modify-write time (i.e. time to read data from a band, update the data, and rewrite the data back to a band). Over provisioning may refer to providing extra space on a memory that does not count towards the memory's usable user storage capacity. For example, adding spare sectors to bands to compensate for potential defects may be considered "over provisioning," as such memory space may not count towards a total usable user storage capacity.

As stated, early binding may fix band boundaries before defect locations on a disc are known. Defect management may, for instance, decide not to use a whole track of the disc, or not to use a number of defective sectors. Marking a track as unusable due to defects may render an early-bound band smaller in usable capacity, which for example may make it unusable due to insufficient usable storage area. In such a case, the affected band should ideally include an additional track so as to reduce the over provisioning while meeting read-modify-write constraints. Including an extra track in each band with early binding may allow more bands to remain usable by meeting the minimum usable user capacity constraint when defects are discovered, but this may be a sub-optimal increase in read-modify-write time if the extra track is used, or over provisioning if the track is not used when there are no defects in the band. Alternately, spare sectors outside of the bands may be included, which defective sectors in bands can be mapped to. However, this, it is inefficient to read or write from sectors outside of a band due to the time required for head movement, so this can negatively impact read-modify-write timing.

An alternative approach is late binding, where bands may be defined after defects have been detected. In one implementation, this may be performed without altering the locations of track centers by using guard tracks that are the same width as data tracks, with an integral number of guard tracks used to isolate bands. Late binding may be more complex than early binding, as bands may have variable radial sizes, a variable read-modify-write time, and variable usable and defective sector characteristics based on an amount of detected errors. However, late binding may allow for more efficient use of disc capacity while requiring less over provisioning and enabling high drive performance that may be dependent on same-capacity bands.

As stated, some drives may require a minimum user capacity per band. Drives that dynamically map logical bands of LBA extents to physical bands may have a single logical band size and require that any logical band can be mapped to any physical band. Early binding may result in uncertainty as to the usable user capacity of each band until the exact number of usable sectors per track is determined for each band. The capacity without any defects can be determined from the disk format, and this may be the only guidance available to early binding. Bands can be selected by early binding to meet a minimum capacity without defects, or may include additional space to accommodate some number of defects. However, an early-bound band that does not have sufficient capacity after defects are found may require that the band either (a) not be used, or (b) have some spare capacity allotted to it from outside the band to make up for the defective sectors. In the former case, unusable bands can degrade the band selection and garbage collection performance of a drive, or make the drive not meet the target total storage capacity. In the latter case, the drive performance may be degraded due to the access time for spare sectors. In contrast, late binding allows each band to meet the minimum user capacity without ambiguity. With late binding there may be no need for retiring bands from use or allocating spare capacity to bring a band up to a minimum capacity, because the band boundaries can be modified to accommodate discovered defects.

FIG. 5 depicts a diagram of an illustrative embodiment of a system for binding shingled recording bands. In the example embodiment, each band may desirably include a minimum of 40 usable data sectors. A band containing 4 data tracks, with each track containing 10 sectors as shown in FIG. 5, meets this requirement. FIG. 5 may be an example of two bands in a drive using early binding of bands. Band A may have no defective sectors, and may be a fully-performing and usable band. However, defect detection may find three defective sectors in Band B, such as from a small scratch. Band B may therefore contain only 37 usable sectors, which may be less than a usable minimum. With early binding, Band B may be unusable, and the 37 valid sectors may be functionally wasted. In other embodiments, the three defective sectors may be remapped to spare sectors elsewhere on the disc, but this may negatively impact read and write times to Band B.

FIG. 6 is a diagram of another illustrative embodiment of a system for binding shingled recording bands. Some drives may select, say, 4 tracks per band with one unused track between bands for isolation, for example in order to meet constraints such as a bounded read-modify-write time. However, many tracks on a disc may be marked as unusable due to defect management. This, in turn, may result in many unused or under-performing bands. Alternately, bands could be configured with extra tracks or sectors to account for potential defects. However, with early binding this may result in unnecessary extra sectors or tracks being allocated where they end up not being needed.

Similar to FIG. 5, FIG. 6 depicts an example of two bands, Band A and Band B, of a disc with bands defined using early binding. Once again a minimum amount of usable storage area may be 40 sectors. Unlike FIG. 5, the example of FIG. 6 adds an extra track of spare sectors to each band in case of defects. Band A has no defects, and therefore does not end up using any of the spare sectors. Band B has a track with a number of defective sectors, and defect management may decide not to use the entire track. Instead, the track of spare sectors can be used, thereby maintaining the minimum 40 usable data sectors in Band B. In some other embodiments, defect management may only decide not to use the three defective sectors, and may use the first three spare sectors in the last track for user data, with seven spare sectors left at the end. While both Band A and Band B are usable in this example, it required using 20% more tracks. On a typical disc, the majority of the spare tracks may not be needed, which may lead to inefficient use of disc space.

In an alternative embodiment, spare sectors may be located outside the band on another part of the disc. Defective sectors may be mapped to these outside spare sectors. This may require less tracks devoted to spare sectors on a disc, but may greatly reduce drive response time as data is retrieved from both the target band and another area of the disc with the spare sectors.

Turning now to FIG. 7, a diagram of another illustrative embodiment of a system for binding shingled recording bands is shown. The example of FIG. 7 may also show two bands A and B, with a designated minimum of 40 usable sectors. The example of FIG. 7 may show an example where late binding of bands is employed, which may bind the bands after defect detection has been performed. The tracks of Band A may have no detected defective sectors, and therefore Band A may be bound with only four tracks of 10 sectors to meet the minimum sector requirement. One of the tracks shown for Band B may have a number of defective sectors. Defect management may decide not to use that track. Therefore when the bands are bound, four usable tracks may be assigned for Band B and the tracks with defective sectors may be ignored or skipped. In some embodiments, extra tracks or sectors beyond the required capacity may be assigned to a band when needed to compensate for defective sectors, and accordingly bands may not be rendered unusable or deficient due to performing defect discovery after binding. In this case, selecting band boundaries with late binding such that each band has four usable tracks (or 40 useable sectors) may lead to fewer wasted bands and thus less over provisioning.

FIG. 8 depicts a diagram of another illustrative embodiment of a system for binding shingled recording bands. In the example of FIG. 8, bands and isolation tracks may consist of fractional tracks instead of complete tracks. For example, as discussed above, some tracks on a disc may have a different number of sectors than other tracks, and therefore it may be desirable to define bands based on a number of sectors rather than a number of tracks. As long as adjacent bands are sufficiently isolated from one another to prevent ATI from rendering data unreadable, bands and isolation tracks may use complementary fractions of a track. For example, the last track of a band may include ¼ of a track of data sectors and ¾ of a track for isolation sectors, while the next track may have approximately ¼ of a track of isolation sectors, and approximately ¾ of a track of data sectors of the next band. For more information, see U.S. patent application entitled "Isolated Shingled Bands of Fractional Tracks," filed for Timothy R. Feldman on the same date as the present disclosure.

In the example of FIG. 8, each band may have a minimum 24 usable sectors, and the depicted tracks may have 10 sectors each. The bands of FIG. 8 may be defined with late binding, after detecting errors and defects on the disc. The sectors of Band A may have no defects, and therefore Band A may be bound with 24 usable data sectors and an isolation track. Band B may include three sectors with defects. Late binding may allow for binding Band B with 27 sectors, three of which are defective, for 24 usable data sectors. This approach may allow for a very small number of unusable bands or unnecessary spare sectors or tracks.

In some embodiments, a drive may have logical bands of varied sizes, with corresponding sets of physical bands. For example, a drive could be configured to use small, medium, and large logical bands that correspond to different LBA capacities, and which map to small, large, and medium physical bands. As another example, bands could be designated as "standard" sized, half sized, and double sized, and data may be mapped to different-sized bands based on file type, frequency of updates, or other constraint. In some embodiments, a user may select one or more sizes for bands, for example during an initial drive setup, and the drive could perform binding on the memory to match the selected-size bands. Late binding allows selectable band sizes in addition to compensating for discovered defects.

Figure 9:
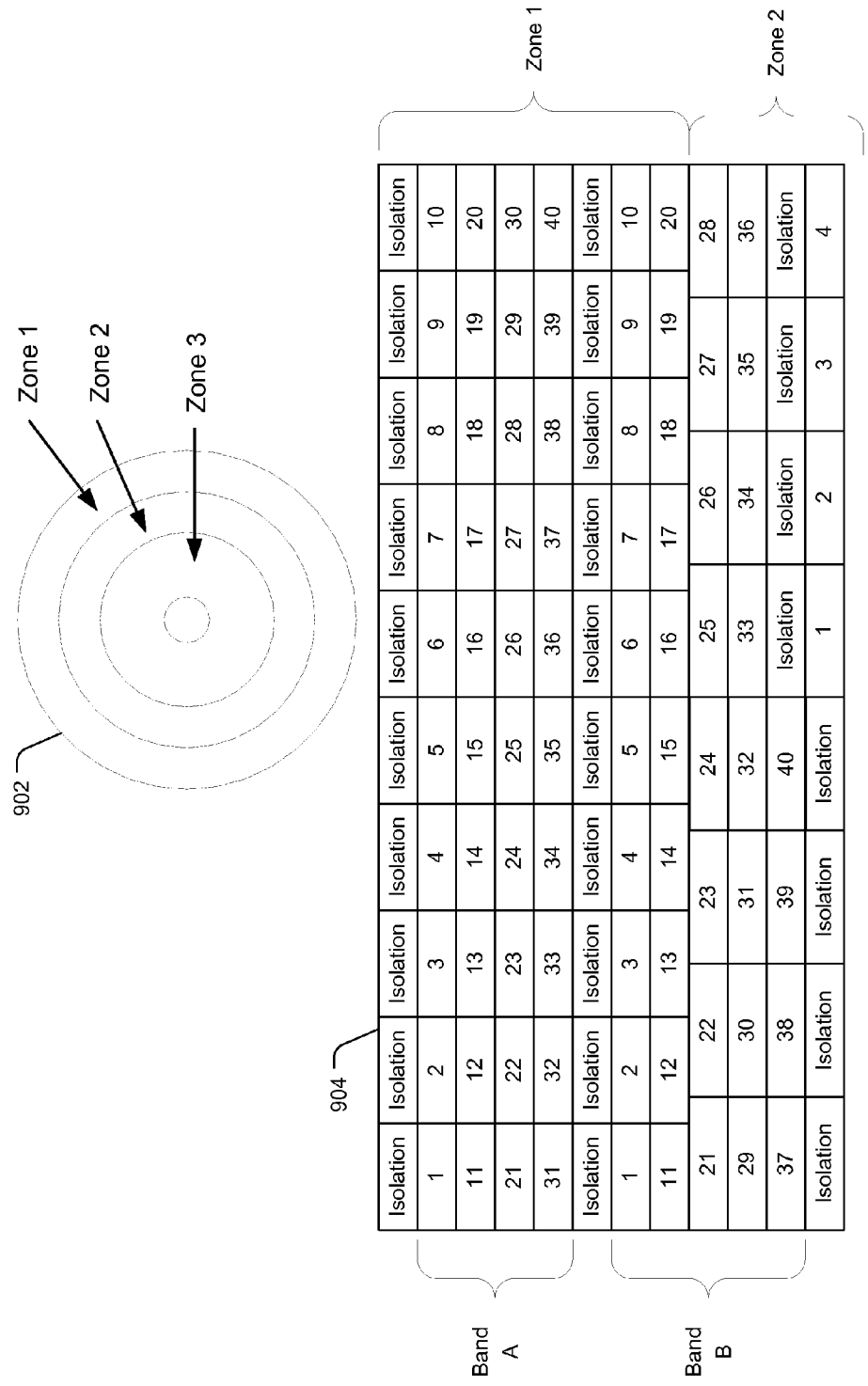
FIG. 9 is a diagram of another illustrative embodiment of a system for binding shingled recording bands.

FIG. 9 depicts a diagram of another illustrative embodiment of a system for binding shingled recording bands. Memory 902 may be a disc configured to employ shingled magnetic recording, and further may be configured with a plurality of data zones, such as depicted Zones 1, 2, and 3. Each zone may have a plurality of tracks, and may also include one or more shingled bands. Different data zones may have a different number of sectors per track. As the radius changes the circumference changes (i.e. the circumference at the outer diameter is greater than the circumference at the inner diameter), and since linear density is a first-order limitation to the number of sectors per track, radii can be selected at which to change from one number of sectors per track to another. The data zone boundaries may not necessarily coincide with desired SMR band boundaries. Early binding can manage this by, for example, constraining the number of tracks in a data zone to a multiple of the tracks in an SMR band, with the result that an SMR band never spans a zone boundary. However, this may be a suboptimal constraint for late binding, where the size and boundary of bands may differ based on error detection.

Diagram 904 depicts an example embodiment of bands which span data zone boundaries. In the depicted example, each band may have a minimum of 40 usable data sectors, but the number of data sectors per track may differ between zones. Zone 1, near the outer diameter of the disc 902, may have 10 sectors per track, while zone 2 may have 8 sectors per track. Tracks from different zones depicted in the diagram 904 may be shown as the same size to represent a full revolution of the disc, but in practice the tracks closer to the ID may have less total area, and consequently each track may contain fewer data sectors. As shown in diagram 904, band A may be located wholly within zone 1, while band B may be partially within zone 1 and partially within zone 2. Accordingly, band B may include tracks with a different number of sectors per track, and may further include a partial track as described for FIG. 8.

Figure 10:
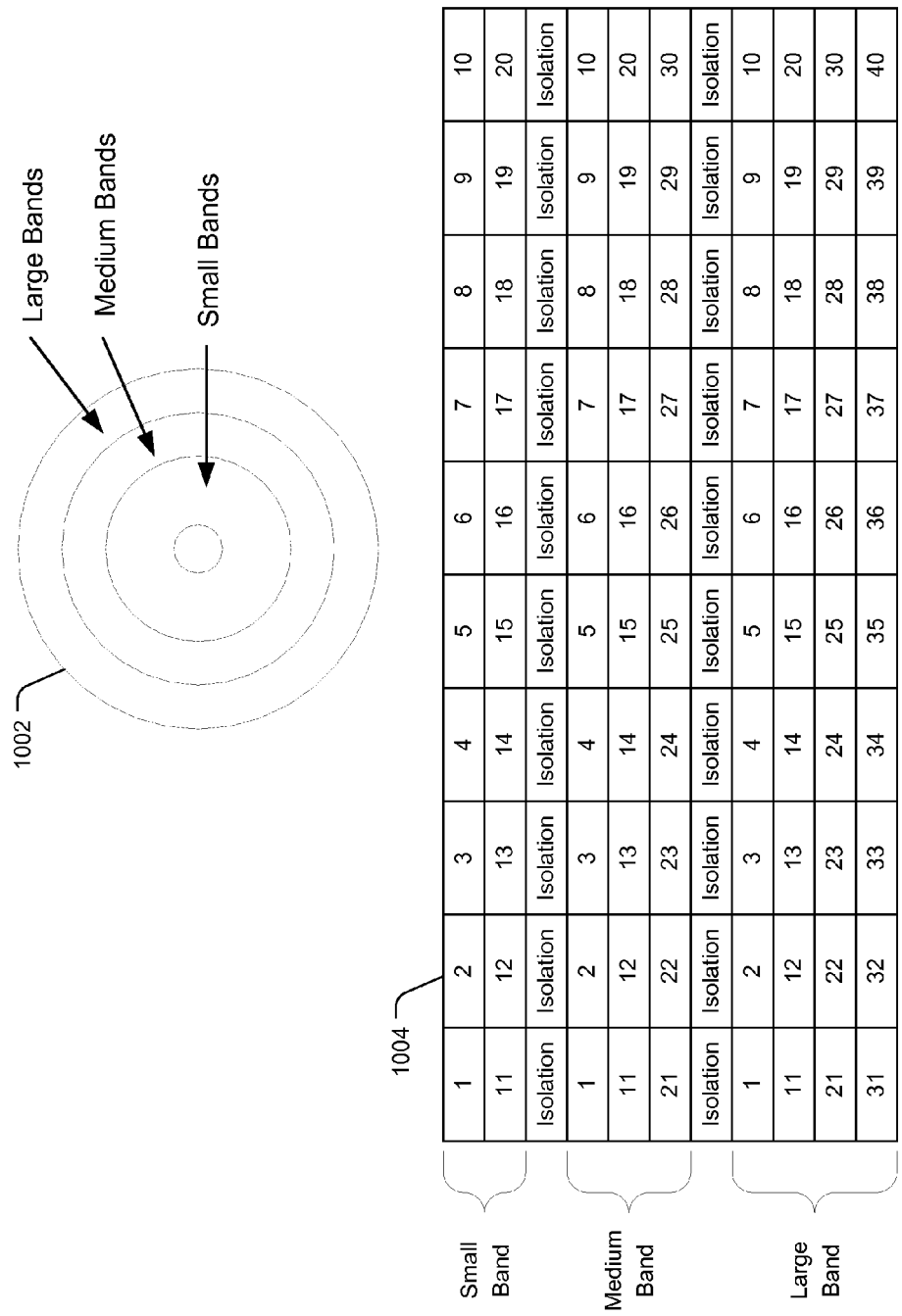
FIG. 10 is a diagram of another illustrative embodiment of a system for binding shingled recording bands.

FIG. 10 depicts a diagram of another illustrative embodiment of a system for binding shingled recording bands. Memory 1002 may be a disc configured to employ shingled magnetic recording, and further may be configured to employ bands of different sizes. For example, physical bands (e.g. the physical area of a memory where the data of a logical band may be written) may be bound on a disc with different sizes depending on selected logical band sizes (e.g. a logical band may refer to a set of LBAs and the data associated with those LBAs, where a logical band may be moved between different physical bands). In some embodiments, a DSD may have memories configured with multiple logical band sizes, not requiring a selection from a host device or user. In some embodiments, a host device or user may be able to select one or more logical band sizes, and a data storage device may bind physical bands based on the selected logical band sizes. Selecting a logical band size may comprise selecting a number of LBAs or a total usable user capacity of a band, and a DSD may bind an appropriate number of physical sectors per physical band based on the selection. In the depicted embodiment, bands near the OD may be large bands to accommodate a large number of LBAs, bands near the ID may be small bands, and bands in the middle of the memory may be medium-sized bands.

Diagram 1004 depicts an example embodiment of bands having varying size. In the example embodiment, a disc may have small logical or physical bands with a 20 LBA capacity, medium bands with a 30 LBA capacity, and large bands with a 40 LBA capacity. These varying-size bands could be grouped together in sets of small, medium, and large bands as shown in 1002, or they may be otherwise apportioned across a disc. For example, each zone of a disc may contain one or more of small, medium, and large bands. In some embodiments, more or fewer band sizes may be specified. For example, a user may choose to only have a single band size on a disc, but may specify how large those bands are. In some embodiments, a user may be able to select from a number of potential band sizes set by a manufacturer of a drive. For example, a user may be able to select between a number of pre-configured performance options, and the drive may bind band sizes according to the selections. A user may also be able to select how many bands of each size are desired, or a percentage of the available memory capacity to devote to each set of band sizes. Once a user has selected the desired band sizes, the drive may perform binding to select band boundaries, for example based on detected defects and user-selected criteria.

A drive with multiple band sizes may handle the different-sized bands in sets, so that a small-sized logical band X can be dynamically mapped to any physical band from a set of small-sized bands. In some embodiments, a logical band may be mapped to any physical band large enough to accommodate it. For example, a small logical band may be mapped to a small, medium, or large physical band. In some embodiments, logical bands may be configured as some fraction of physical band sizes, and may be mapped between the physical bands accordingly. For example, a DSD may have physical bands of 60 data sectors, and may support logical bands of small (15 sectors), medium (30 sectors), or large (60 sectors) sizes. In such an example embodiment, a physical band may have four small logical bands mapped to it, or two medium bands, or one large band. The DSD may also support mapping combinations, such as two small logical bands and one medium band to a single physical band.

Data storage devices may be configured to have multiple logical band sizes, multiple physical band sizes, or both. In some embodiments, there may be one logical band size but multiple physical band sizes. In examples with multiple logical bands mapped to a large physical band, the space of the physical band may be well utilized. Another advantage is if there are multiple logical band sizes but one physical band size. Again, with multiple small logical bands in a physical band the space may be well utilized.

There can be many reasons for multiple physical band sizes; on reason may be to satisfy a track count constraint. There can also be many reasons for multiple logical band sizes. For example, an application may select an appropriately-sized logical band based on a size of the data object to be stored. If there is a constraint for objects not to share logical bands, or for a minimum number of objects to share a logical band, then having multiple logical band sizes allows a fit algorithm to achieve better space utilization. A fit algorithm may be used to select an appropriate logical band in which to store data to effectively use storage space.

In an example embodiment, a disc may be configured so that the number of tracks per band may be larger at the OD and smaller at the ID. Since tracks near the OD may also have more data sectors than tracks near the ID, this may result in physical bands being significantly larger near the OD. The desire may be to have a range of band capacities, for instance so that best fit algorithms can be used or for frequently updated data to be placed in smaller bands where the update cost is smaller. Assigning larger track counts to the OD may mean that a smaller portion of the high capacity tracks are relegated to isolation, and thus the format efficiency of the drive may be improved.

Figure 11:
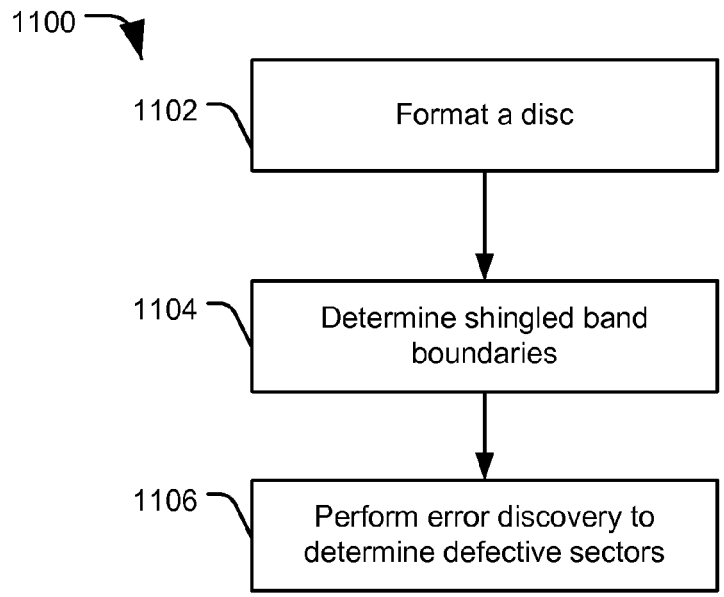
FIG. 11 is a flowchart of an illustrative embodiment of a method for binding shingled recording bands.

FIG. 11 is a flowchart of an illustrative embodiment of a method for binding shingled recording bands, generally designated 1100. At 1102, the method may comprise formatting a disc. In an example, a disc may be formatted by a multiple disc writer and installed into a drive, or it may be formatted after being installed by the drive itself. The method may then comprise binding the bands by determining the band boundaries. For example, the bands may be defined based on an amount of tracks written to the disc when it was formatted. The drive may then perform defect discovery and mapping to determine defective sectors, at 1104. This may identify defective sectors in shingled bands that may render the bands unusable or deficient. For example, a band may not have sufficient storage capacity, and may either be retired or have defective sectors mapped to spare sectors.

Figure 12:
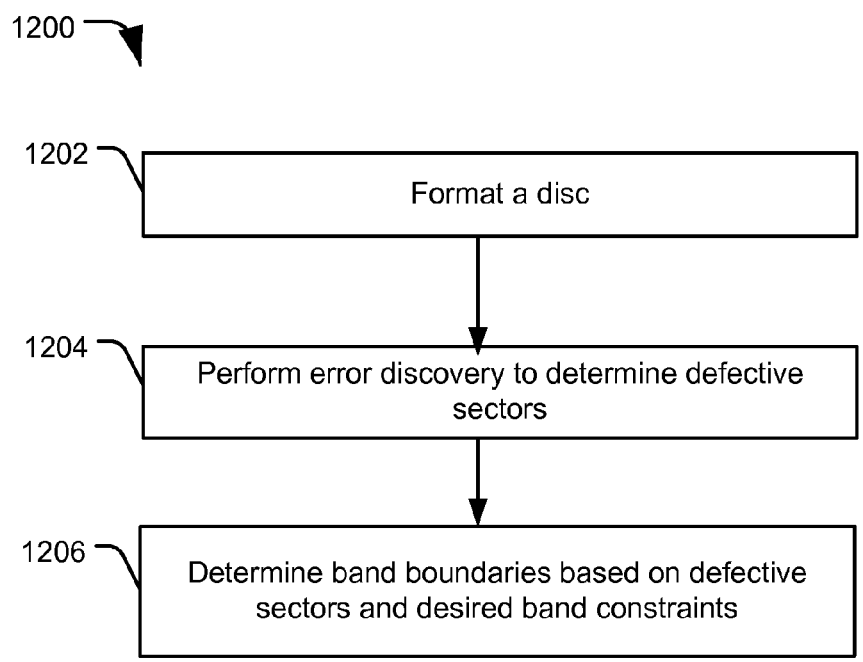
FIG. 12 is a flowchart of an illustrative embodiment of a method for binding shingled recording bands.

FIG. 12 is a flowchart of another illustrative embodiment of a method for binding shingled recording bands, generally designated 1200. The method may comprise formatting a disc, at 1202. The method may comprise performing error discovery on the disc to determine defective sectors, at 1204. Thus, the defective sectors may be predetermined before determining band boundaries. After determining defective sectors, the method may comprise binding the bands by determining band boundaries based on the predetermined defective sectors (e.g. a list of defective sectors) and any desired band constraints, at 1206. For example, if a constraint includes a minimum amount of usable data sectors, the bands can be defined to meet the minimum amount of sectors while considering any defective sectors.

Figure 13:
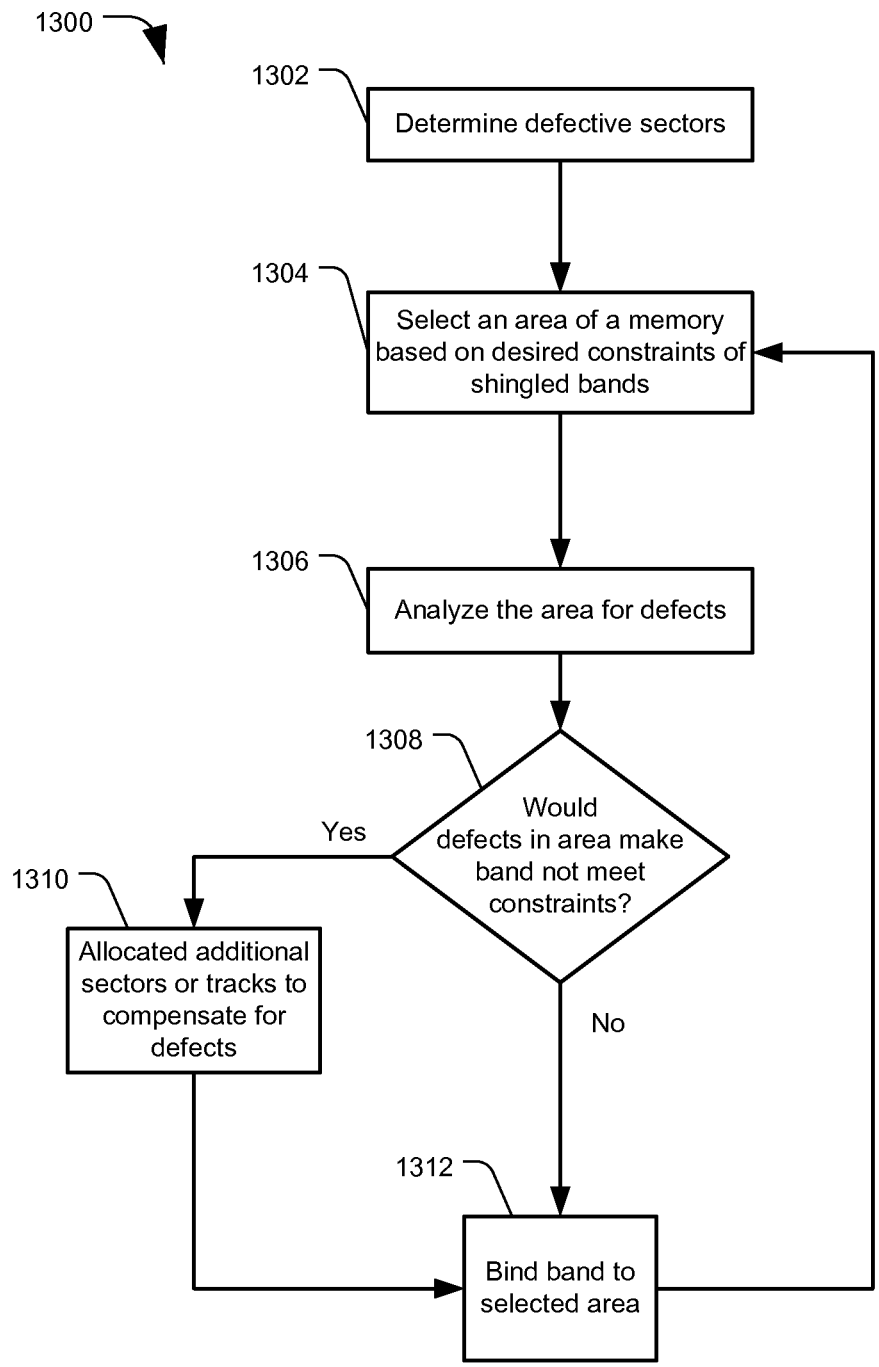
FIG. 13 is a flowchart of another illustrative embodiment of a method for binding shingled recording bands.

FIG. 13 is a flowchart of another illustrative embodiment of a method for binding shingled recording bands, generally designated 1300, which may be directed to late binding of bands. The method 1300 may comprise determining defective sectors of a memory, at 1302. This may include creating a defect table identifying defective sectors. The method may next comprise selecting an area of a memory based on desired constrains of shingled bands, at 1304. For example, this may include a certain amount of sectors or tracks such that read-modify-write operations would not exceed a time threshold, or a minimum amount of storage capacity of usable data storage. If a minimum of 40 sectors of space a constraint, the method may select an area of 40 sectors to analyze at 1304.

The method 1300 may next involve analyzing the selected area for defects, at 1306. This may comprise comparing the sector range against a defect table to determine if there are any defective sectors in the selected area. A determination may be made as to whether the defects in an area would cause a band to not meet the constraint requirements, at 1308. For example, if the area included 40 sectors and a constraint is a minimum of 40 usable sectors, a defective sector may cause the area to be unsuitable for a usable band. In some embodiments, a selected area may have flexibility such that up to a certain number of defective sectors would not cause a band to become unusable.

If the defective sectors would cause the area to be unsuitable for a band at 1308, the method may include allocating additional storage space to the selected area, at 1310. For example if defects result in the area not having sufficient usable sectors, an amount of non-defective sectors may be added to the area such that the minimum number of sectors is met. Additional area may be allocated by sector, by track, or by other incremental amount.

If the defects would not cause an area to be unsuitable for a band at 1308, or if sufficient additional space was allocated to the area to compensate for the defective sectors at 1310, the method may comprise binding a band to the selected area, at 1312. The method 1300 may then involve selecting a next area for a next band at 1304.

While many of the examples and embodiments disclosed herein are directed toward shingled magnetic recording, late binding can be employed in non-shingled media as well. For example, late binding may be applied to zones on a non-shingled disc media.

In accordance with another embodiment, the methods described herein may be implemented as one or more software programs running on a computer processor, controller device, or other computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device storing instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a controller configured to:
perform a defect discovery scan on a data storage medium to determine defective sectors; and
define boundaries of a writable area of a band of the data storage medium based on defective sectors located in the band and a number of usable sectors of the band, the band including a plurality of shingled tracks of the data storage medium where one track partially overlaps an adjacent track, at least two of the plurality of shingled tracks having a different number of sectors per track.

2. The apparatus of claim 1 further comprising:
the controller further configured to define boundaries of the writable area by designating a first track and a last track.

3. The apparatus of claim 1 further comprising:
the constraint includes an amount of time to:
read data from the writable area;
modify the read data; and
write the modified data to the writable area.

4. The apparatus of claim 1 further comprising:
the constraint includes a selected number of non-defective data sectors in the writable area.

5. The apparatus of claim 4 further comprising:
the controller configured to:
define the boundaries of the writable area by designating at least one guard track to separate the writable area from other writable data sectors, the at least one guard tracks not being used to store user data.

6. The apparatus of claim 1 comprising the controller further configured to:
define boundaries of the writable area based on a first selected capacity; and
define boundaries of another writable area of a second shingled band of the data storage medium based on a second selected capacity different from the first selected capacity, the another writable area also configured to store data in a shingled manner.

7. The apparatus of claim 1 further comprising:
the controller further configured to perform the defect discovery scan on the data storage medium to obtain a list of the defective sectors prior to defining the boundaries of the writable area.

8. The apparatus of claim 7 further comprising:
the controller configured to format tracks on the data storage medium prior to performing the defect discovery scan.

9. The apparatus of claim 1 further comprising:
the data storage medium, configured into a plurality of zones each having a plurality of tracks, the tracks of each zone having a different number of sectors per track than the other zones; and
the controller further configured to define the boundaries of the writable area of the band so that the writable area includes tracks from two adjacent zones.

10. A method comprising:
formatting a data storage medium;
performing a defect discovery scan on the data storage medium to determine defective sectors; and
defining boundaries of a writable area of a band of the data storage medium based on a storage capacity constraint and a number of individual defective sectors located in the band, the band including a plurality of tracks and configured so that each track of the band except the last track is partially overlapped by an adjacent track.

11. The method of claim 10 further comprising:
the storage capacity constraint includes a minimum number of non-defective data sectors in the writable area.

12. The method of claim 11 further comprising:
defining the boundaries of the writable area includes designating at least one guard track to separate the writable area from writable data sectors of the data storage medium outside the writable area, the at least one guard track not being used to store user data.

13. The method of claim 9 further comprising:
performing the defect discovery scan on the data storage medium to obtain a list of the defective sectors prior to defining boundaries of the writable area.

14. The method of claim 9 further comprising:
defining boundaries of the writable area further based on a logical data capacity selected by a user.

15. The method of claim 10 further comprising:
defining the boundaries of at least one band such that at least two of the plurality of shingled tracks include a different number of sectors per track.

16. An apparatus comprising:
a data storage device including:
a memory configured to store data in a shingled manner where one track partially overlaps an adjacent track;
a controller configured to:
perform an error discovery scan to determine defective sectors of the memory; and
define boundaries of writable areas of a plurality of bands, each band including a plurality of tracks of the memory, based on a number of individual defective sectors identified in the error discovery scan and at least one selected band constraint including a minimum number of usable data sectors.

17. The apparatus of claim 16 further comprising the controller configured to:
define the boundaries based on at least one selected band constraint including an amount of time to:
read data from the writable areas;
modify the read data; and
write the modified data to the writable areas.

18. The apparatus of claim 17 further comprising the controller configured to:
define guard tracks to separate each band in the plurality of bands from writable data sectors of adjacent bands, the guard tracks not being used to store user data; and
define the guard tracks to include defective data sectors located in a first track or last track of each band.

19. The apparatus of claim 16 further comprising:
the memory configured into a plurality of zones each having a plurality of tracks, the tracks of each zone having a different number of sectors per track than other zones of the plurality of zones; and
the controller further configured to define the boundaries of the writable area of at least one band from the plurality of bands so that the boundaries include tracks from two adjacent zones.

20. The apparatus of claim 16 further comprising:
the controller further configured to define boundaries of at least two bands from the plurality of bands to include different numbers of usable data sectors and different storage capacities.

* * * * *